United States Patent
Hasegawa et al.

(10) Patent No.: US 12,362,373 B2
(45) Date of Patent: Jul. 15, 2025

(54) FUEL GAS SUPPLY SYSTEM FOR FUEL CELL AND METHOD OF CONTROLLING FUEL GAS SUPPLY SYSTEM

(71) Applicant: TOYOTA JIDOSHA KABUSHIKI KAISHA, Toyota (JP)

(72) Inventors: Shigeki Hasegawa, Toyota (JP); Yusuke Miyamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 560 days.

(21) Appl. No.: 17/820,323

(22) Filed: Aug. 17, 2022

(65) Prior Publication Data

US 2023/0129936 A1    Apr. 27, 2023

(30) Foreign Application Priority Data

Oct. 27, 2021  (JP) .................. 2021-175690

(51) Int. Cl.
| | |
|---|---|
| *H01M 8/04* | (2016.01) |
| *H01M 8/04089* | (2016.01) |
| *H01M 8/0438* | (2016.01) |
| *H01M 8/04746* | (2016.01) |

(52) U.S. Cl.
CPC ... *H01M 8/04753* (2013.01); *H01M 8/04089* (2013.01); *H01M 8/0438* (2013.01); *H01M 2250/20* (2013.01)

(58) Field of Classification Search
CPC ......... H01M 8/04753; H01M 8/04089; H01M 8/0438; H01M 2250/20
USPC ...................................................... 429/444
See application file for complete search history.

(56) References Cited

U.S. PATENT DOCUMENTS

| | | | |
|---|---|---|---|
| 2011/0087441 A1* | 4/2011 | Salvador ........... | H01M 8/04302 702/24 |
| 2015/0207158 A1* | 7/2015 | Nanba ................ | H01M 8/04119 429/442 |
| 2016/0141651 A1* | 5/2016 | Matsubara ........ | H01M 8/04753 429/415 |
| 2018/0366753 A1* | 12/2018 | Okuyoshi ........... | H01M 8/1007 |
| 2020/0251760 A1 | 8/2020 | Hasegawa et al. | |
| 2021/0313602 A1* | 10/2021 | Kusano ............. | H01M 8/04014 |

FOREIGN PATENT DOCUMENTS

| | | |
|---|---|---|
| JP | 2005327597 A | 11/2005 |
| JP | 2007165162 A | 6/2007 |
| JP | 2020145181 A | 9/2020 |
| WO | 2005/112159 A1 | 11/2005 |

* cited by examiner

*Primary Examiner* — James M Erwin
(74) *Attorney, Agent, or Firm* — SoraIP, Inc.

(57) ABSTRACT

A fuel gas supply system for a fuel cell includes an injector, an inlet pressure acquisition unit, a discharge valve, a hydrogen partial pressure acquisition unit, and a controller. The controller is configured to stop driving the injector when a hydrogen partial pressure reaches or exceeds a first upper limit value in a state where the injector is being driven, and start driving the injector when the hydrogen partial pressure falls to or below a first lower limit value in a state where the injector is stopped. The controller is configured to open the discharge valve when an inlet pressure reaches or exceeds a second upper limit value in a state where the discharge valve is closed, and close the discharge valve when the inlet pressure falls to or below a second lower limit value in a state where the discharge valve is open.

7 Claims, 2 Drawing Sheets

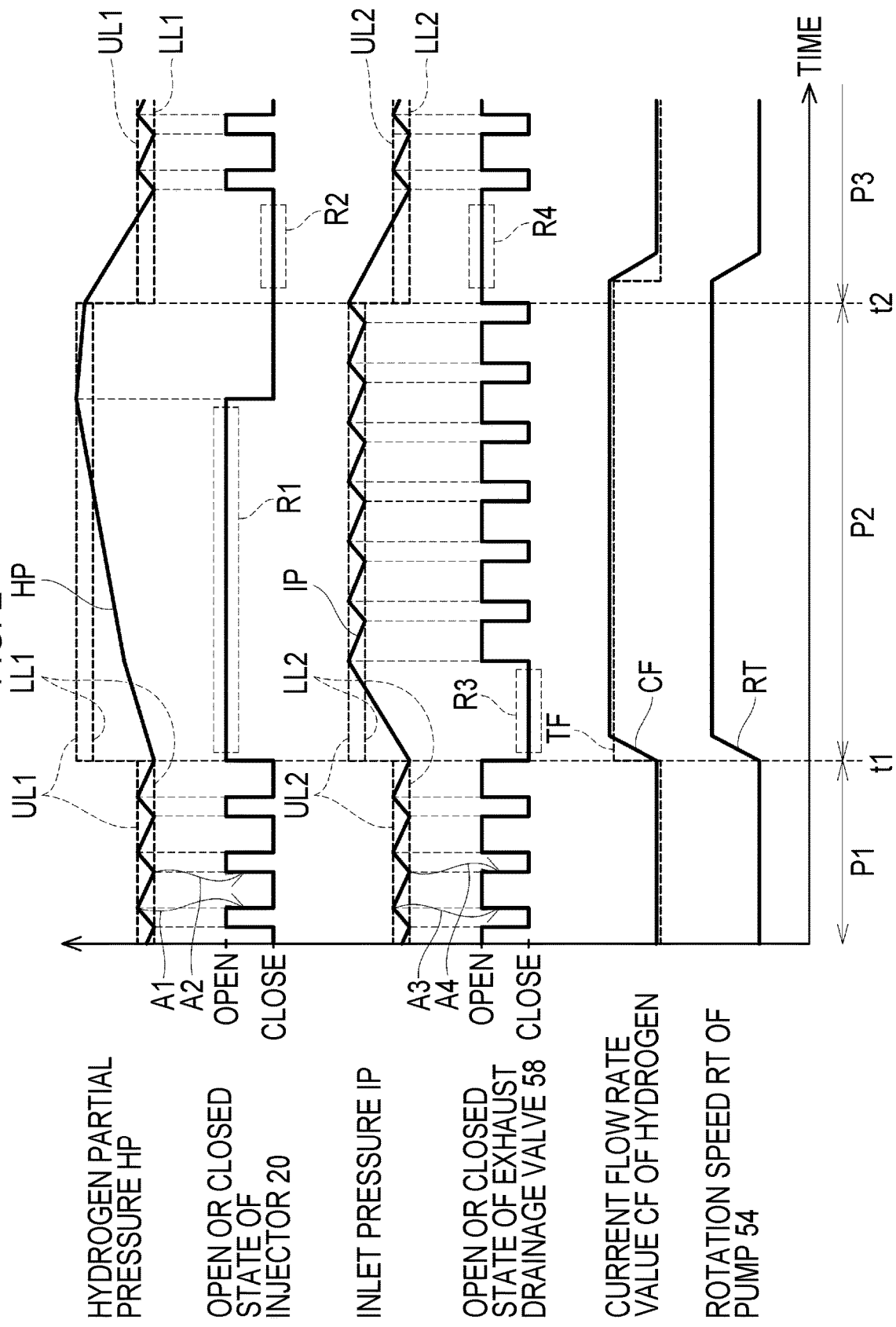

FUEL GAS SUPPLY SYSTEM FOR FUEL CELL AND METHOD OF CONTROLLING FUEL GAS SUPPLY SYSTEM

CROSS-REFERENCE TO RELATED APPLICATION

This application claims priority to Japanese Patent Application No. 2021-175690 filed on Oct. 27, 2021, incorporated herein by reference in its entirety.

BACKGROUND

1. Technical Field

The techniques disclosed herein relate to a fuel gas supply system for a fuel cell and a method of controlling the fuel gas supply system.

2. Description of Related Art

Japanese Unexamined Patent Application Publication No. 2020-145181 (JP 2020-145181 A) discloses a fuel cell system including a fuel cell stack, an injector that supplies fuel to a fuel gas inlet of the fuel cell stack through a supply channel, and a discharge valve that discharges fuel off gas and the like from a fuel gas outlet of the fuel cell stack through a discharge channel. In the technique of JP 2020-145181 A, each of a plurality of state quantities is estimated and controlled to a target value by modeling an entire fuel gas supply system included in the fuel cell system. Therefore, means for controlling each of the state quantities to the target value has a structure built by combining the operations of a plurality of components. For example, the means controls operations of two or more components, including an injector and a discharge valve, to control two or more state quantities, including hydrogen partial pressure and fuel cell stack inlet pressure.

SUMMARY

In the technique of JP 2020-145181 A, when some characteristics of the fuel gas supply system change, such as the change in the specifications of the injector or the discharge valve, the change in piping shape, or the like, models of the entire fuel gas supply system are needed to be reviewed. That is, it is necessary to perform large-scale operation adaptation again for control logic of the entire fuel gas supply system. When some characteristics of the fuel gas supply system are needed to be changed, such as a case where the fuel gas supply system is expanded to other applications, a large amount of development man-hours are required.

A first aspect of the present specification relates to a fuel gas supply system for a fuel cell. The fuel gas supply system for the fuel cell includes an injector connected to a fuel gas inlet of a fuel cell stack through a supply channel and configured to supply a fuel gas, an inlet pressure acquisition unit configured to acquire an inlet pressure that is a pressure of the supply channel, a discharge valve connected to a fuel gas outlet of the fuel cell stack through a discharge channel, a hydrogen partial pressure acquisition unit configured to acquire a hydrogen partial pressure of a fuel off gas in the discharge channel, and a controller. The controller is configured to specify a first upper limit value and a first lower limit value corresponding to the hydrogen partial pressure based on a demand load on the fuel cell stack, stop driving the injector when the hydrogen partial pressure reaches or exceeds the first upper limit value in a state where the injector is being driven, and start driving the injector when the hydrogen partial pressure falls to or below the first lower limit value in a state where the injector is stopped. The controller is configured to specify a second upper limit value and a second lower limit value corresponding to the inlet pressure based on the demand load on the fuel cell stack, open the discharge valve when the inlet pressure reaches or exceeds the second upper limit value in a state where the discharge valve is closed, and close the discharge valve when the inlet pressure falls to or below the second lower limit value in a state where the discharge valve is open.

According to the above aspect, in order to control one state quantity, which is the hydrogen partial pressure in the discharge channel, in the range from the first upper limit value to the first lower limit value, the operation of one component of the injector is controlled. Further, in order to control one state quantity, which is the inlet pressure of the supply channel, in the range from the second upper limit value to the second lower limit value, the operation of one component of the discharge valve is controlled. That is, the control of one state quantity to a target value can be achieved by the operation of one component. Furthermore, the control of each state quantity can be performed independent of that of the other. Therefore, even when some characteristics of the fuel gas supply system are changed (e.g., when the injector is changed), it is sufficient that operation adaptation is performed just for one state quantity related with the changed characteristic. This makes it possible to significantly reduce the development man-hours when some characteristics of the fuel gas supply system are changed.

In the above aspect, the fuel gas supply system may further include a circulation channel configured to connect the discharge channel and the supply channel. The fuel gas supply system may further include a pump disposed on the circulation channel and configured to deliver the fuel off gas to the supply channel. The fuel gas supply system may further include an inlet hydrogen concentration acquisition unit configured to acquire an inlet hydrogen concentration at an inlet of the pump. The fuel gas supply system may further include a flow rate acquisition unit configured to acquire a discharge flow rate of the pump. The controller may be configured to specify a target flow rate value of hydrogen discharged from the pump based on the demand load on the fuel cell stack, calculate a current flow rate value of hydrogen discharged from the pump based on the inlet hydrogen concentration and the discharge flow rate, and control the pump such that the current flow rate value approaches the target flow rate value. With the configuration, it is possible to implement the controlling of one state quantity, which is the current flow rate value of hydrogen, to approach the target flow rate value by the operation of one component of the pump.

In the above aspect, the controller may be configured to execute feedback control of a rotation speed of the pump to reduce a deviation between the target flow rate value and the current flow rate value. In this way, it is possible to appropriately execute the control such that the current flow rate value approaches the target flow rate value.

In the above aspect, the fuel gas supply system may further include a gas-liquid separator provided in the discharge channel and configured to separate and store liquid water contained in the fuel off gas. The controller may open the discharge valve and discharge the liquid water stored in the gas-liquid separator to an outside in response to the liquid water reaching a predetermined amount. In this way, it is possible to discharge the liquid water contained in the fuel off gas to the outside.

In the above aspect, the fuel gas supply system may include a first machine learning unit that has a first learning model configured to calculate a first feedback gain of control of the injector in response to the hydrogen partial pressure. The first machine learning unit may update the first learning model by using a correlation between the operation amount of the injector and a fluctuation amount of the hydrogen partial pressure as training data. The controller may control the injector based on the first feedback gain determined by the first learning model. In this way, it is possible to appropriately adjust the first feedback gain without having to do anything complicated work. In controlling the hydrogen partial pressure by the injector, it is possible to suppress overshoot and improve the response speed.

In the above aspect, the fuel gas supply system may further include a second machine learning unit that has a second learning model configured to calculate a second feedback gain of control of the discharge valve in response to the inlet pressure. The second machine learning unit may update the second learning model by using a correlation between an operation amount of the discharge valve and a fluctuation amount of the inlet pressure as training data. The controller may control the discharge valve based on the second feedback gain determined by the second learning model. In this way, it is possible to appropriately adjust the second feedback gain without having to do anything complicated work. In controlling the inlet pressure by the discharge valve, it is possible to suppress overshoot and improve the response speed.

A second aspect of the present specification relates to a method of controlling a fuel gas supply system including an injector, an inlet pressure acquisition unit, a discharge valve, and a hydrogen partial pressure acquisition unit. The injector is connected to a fuel gas inlet of a fuel cell stack through a supply channel and is configured to supply a fuel gas. The inlet pressure acquisition unit is configured to acquire an inlet pressure that is a pressure of the supply channel. The discharge valve is connected to a fuel gas outlet of the fuel cell stack through a discharge channel. The hydrogen partial pressure acquisition unit is configured to acquire a hydrogen partial pressure of a fuel off gas in the discharge channel. The method includes specifying a first upper limit value and a first lower limit value corresponding to the hydrogen partial pressure based on a demand load on the fuel cell stack, stopping driving the injector when the hydrogen partial pressure reaches or exceeds the first upper limit value in a state where the injector is being driven, starting driving the injector when the hydrogen partial pressure falls to or below the first lower limit value in a state where the injector is stopped, specifying a second upper limit value and a second lower limit value corresponding to the inlet pressure based on the demand load on the fuel cell stack, opening the discharge valve when the inlet pressure reaches or exceeds the second upper limit value in a state where the discharge valve is closed, and closing the discharge valve when the inlet pressure falls to or below the second lower limit value in a state where the discharge valve is open.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a time chart showing an example of operation of a fuel gas supply system.

DETAILED DESCRIPTION OF EMBODIMENTS

Embodiment 1

Configuration of Fuel Cell System 1

Figure 1:
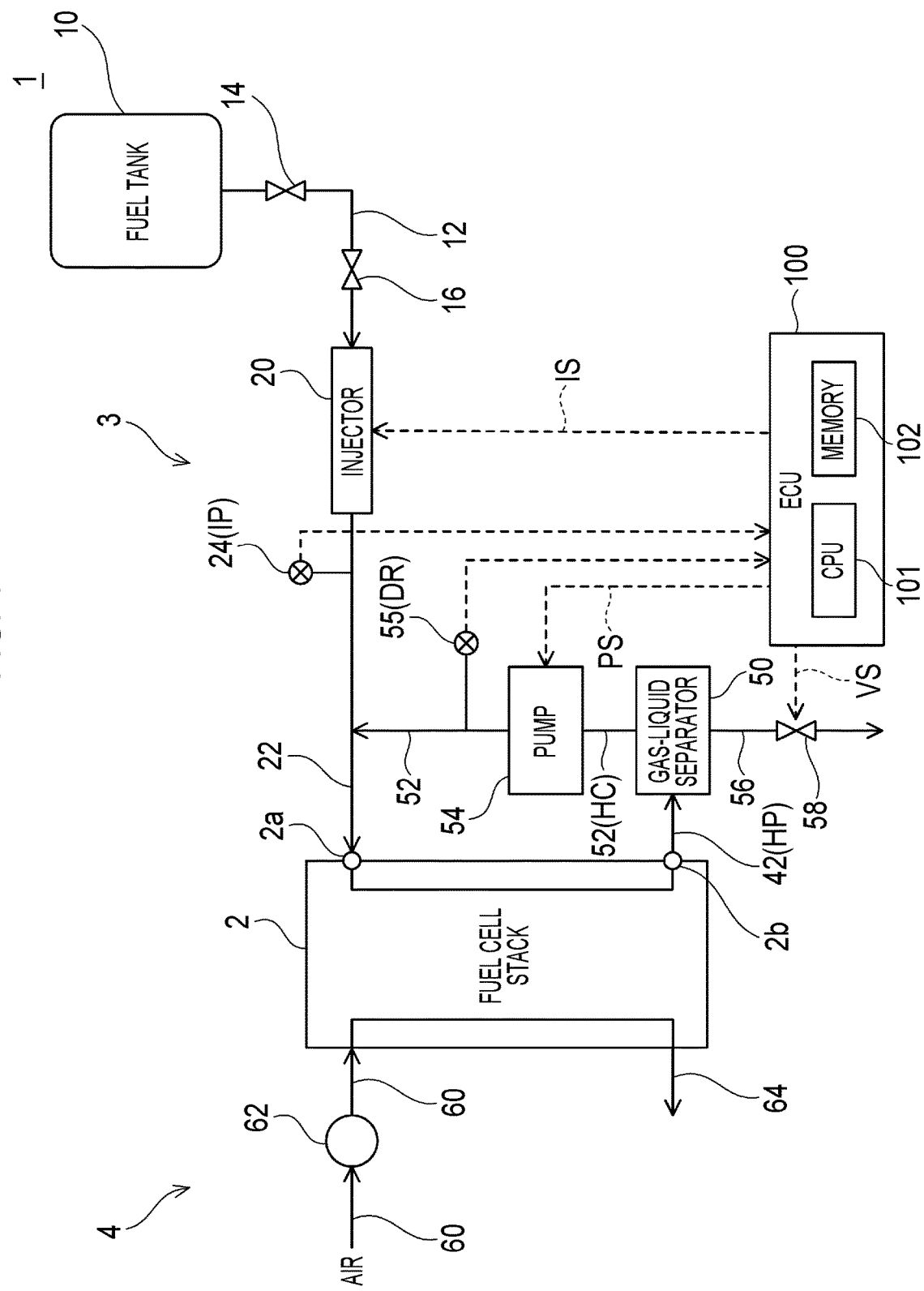
FIG. 1 is a schematic configuration diagram of a fuel cell system.

A fuel cell system 1 will be described with reference to FIG. 1. The fuel cell system 1 is mounted on, for example, a fuel cell vehicle. The fuel cell system 1 includes a fuel cell stack 2, a fuel gas supply system 3, and an air supply system 4.

The fuel cell stack 2 is a device that generates electric power by a chemical reaction between hydrogen and oxygen. Water is produced by the chemical reaction between hydrogen and oxygen. The fuel cell stack 2 includes a plurality of single cells (not shown). Each single cell has a fuel electrode and an air electrode, and fuel gas (hydrogen gas) is supplied to the fuel electrode, and air containing oxygen is supplied to the air electrode to generate electric power. The electric power generated by the fuel cell stack 2 is supplied to, for example, a traveling motor of a fuel cell vehicle. The unreacted fuel gas (hereinafter referred to as "fuel off gas") that has not been used for electric power generation in the fuel cell stack 2 is discharged from the fuel cell stack 2. The fuel off gas contains water produced during electric power generation in the form of steam.

The fuel gas supply system 3 is a device that supplies a fuel gas to the fuel cell stack 2. The fuel gas supply system 3 mainly includes a fuel tank 10, an injector 20, a gas-liquid separator 50, a pump 54, a flow meter 55, and an electronic control unit (abbreviated as ECU) 100.

The fuel tank 10 stores the fuel gas (hydrogen gas in the present embodiment) supplied to the fuel cell stack 2. An upstream end of the first fuel supply channel 12 is connected to the fuel tank 10. A downstream end of the first fuel supply channel 12 is connected to the injector 20. The first fuel supply channel 12 is provided with a main check valve 14 and a pressure reducing valve 16 in this order from upstream to downstream. The main check valve 14 opens and closes the first fuel supply channel 12. When the main check valve 14 is opened, fuel gas is supplied from the fuel tank 10 to the fuel cell stack 2. The pressure reducing valve 16 adjusts the pressure of the fuel gas flowing through the first fuel supply channel 12. The pressure reducing valve 16 can reduce the pressure of the fuel gas supplied to the fuel cell stack 2 through the first fuel supply channel 12.

The injector 20 adjusts the pressure and flow rate of the fuel gas supplied to the fuel cell stack 2. The injector 20 is connected to an upstream end of the second fuel supply channel 22. The downstream end of the second fuel supply channel 22 is connected to the fuel gas inlet 2a of the fuel cell stack 2. The injector 20 is controlled to be in an open or closed state by a control signal IS input from the ECU 100. The pressure and flow rate of the fuel gas are adjusted by adjusting the opening degree and the valve opening time of the injector 20. The injector 20 is, for example, a solenoid valve.

A pressure sensor 24 is provided in the second fuel supply channel 22. The pressure sensor 24 measures an inlet pressure IP, which is the pressure of the fuel gas in the second fuel supply channel 22. The measured inlet pressure IP is input to the ECU 100.

An upstream end of an exhaust gas channel 42 is connected to the fuel gas outlet 2b of the fuel cell stack 2. A downstream end of the exhaust gas channel 42 is connected to the gas-liquid separator 50. The fuel off gas is supplied to the gas-liquid separator 50 through the exhaust gas channel 42. The gas-liquid separator 50 separates and stores water contained in the fuel off gas introduced into the gas-liquid separator 50 from the exhaust gas channel 42. Water vapor contained in the fuel off gas introduced into the gas-liquid separator 50 is cooled, and condensed water (liquid water) is stored in the gas-liquid separator 50.

An upstream end of the exhaust drainage channel 56 is connected to the gas-liquid separator 50. An exhaust drainage valve 58 is provided in the exhaust drainage channel 56. In other words, the exhaust drainage valve 58 is connected to the fuel gas outlet 2b through the exhaust gas channel 42 and the exhaust drainage channel 56. A downstream end of the exhaust drainage channel 56 is open to the outside. The exhaust drainage valve 58 is controlled to be in an open or closed state by a control signal VS input from the ECU 100. When the exhaust drainage valve 58 is opened, useless gas (mainly nitrogen gas) in the gas-liquid separator 50 and liquid water flow to the outside.

A upstream end of a gas circulation channel 52 is connected to the gas-liquid separator 50, and a downstream end thereof is connected to the second fuel supply channel 22. In other words, the gas circulation channel 52 connects the exhaust gas channel 42 and the second fuel supply channel 22. The pump 54 and the flow meter 55 are disposed on the gas circulation channel 52. The pump 54 delivers the fuel off gas in the gas-liquid separator 50 to the second fuel supply channel 22. The fuel off gas delivered to the second fuel supply channel 22 is supplied to the fuel cell stack 2 again. A rotation speed of the pump 54 is controlled by a control signal PS input from the ECU 100. Since the discharge amount per rotation is known, the discharge flow rate can be controlled by controlling the rotation speed.

The flow meter 55 measures a discharge flow rate DR of the pump 54. The measured discharge flow rate DR is input to the ECU 100.

The ECU 100 (controller) includes a CPU 101 and a memory 102 such as a ROM or a RAM. The ECU 100 specifies a load (demand load) demanded of the fuel cell stack 2, and controls the operation of each part such as the injector 20, the exhaust drainage valve 58, and the pump 54 such that a demanded current can be obtained.

Further, the ECU 100 functions as a hydrogen partial pressure acquisition unit and an inlet hydrogen concentration acquisition unit. The hydrogen partial pressure acquisition unit is a portion for estimating a hydrogen partial pressure HP of the fuel off gas in the exhaust gas channel 42. The inlet hydrogen concentration acquisition unit is a portion for estimating an inlet hydrogen concentration HC at an inlet of the pump 54. The process of estimating the hydrogen partial pressure HP and the inlet hydrogen concentration HC may be executed based on various information such as the demand load, the actual electric power generated by the fuel cell stack 2, the measured values of the inlet pressure IP and the discharge flow rate DR, and the like. By estimating the hydrogen partial pressure HP and the inlet hydrogen concentration HC, there may be no need for an actual sensor for measuring the values. Therefore, the cost of the fuel gas supply system 3 can be reduced. Further, when an abnormal value is measured due to the lifetime or failure of the actual sensor, it is likely that requirements, which will be described later, cannot be met, but the likeliness can be lowered by using the estimated values. The specific method for executing these estimation processes is not particularly limited. For example, methods described in JP 2020-145181 A and US 2020-0251760 A can be employed. The entire contents of JP 2020-145181 A and US 2020-0251760 A are incorporated herein by reference in their entirety.

The air supply system 4 is a device that supplies air to the fuel cell stack 2. The air supply system 4 includes a compressor 62. The compressor 62 is disposed on an air supply channel 60. An upstream end of the air supply channel 60 is open to the outside. A downstream end of the air supply channel 60 is connected to the fuel cell stack 2. The compressor 62 pumps the air introduced into the air supply channel 60 to the fuel cell stack 2. Further, an upstream end of an air discharge channel 64 is connected to the fuel cell stack 2. The upstream end of the air discharge channel 64 is open to the outside. The air not used for electric power generation in the fuel cell stack 2 is discharged to the outside through the air discharge channel 64.

Overview of Control of Fuel Gas Supply System 3

A control method for the fuel gas supply system 3 of the present specification is characterized in that a plurality of "single input-single output structures", which implement control of one state quantity by the operation amount of one system component, are provided independently of each other. In the technique of the present specification, in order to determine the state quantity controlled by the single input-single output structure, three requirements to be satisfied by the fuel gas supply system 3 are specified. Then, using three requirements, three state quantities and three operation amounts are specified. This makes it possible to control the fuel gas supply system 3 by using three single input-single output structures. This will be described in detail below.

A first requirement is that the amount of hydrogen needed to suppress deterioration of the fuel cell stack 2 is supplied. Therefore, the state quantity which is the hydrogen partial pressure HP of the exhaust gas channel 42 is needed to be controlled so as not to fall below a lower limit value. Then, the open or closed state of the injector 20 is set as the operation amount for controlling the hydrogen partial pressure HP The exhaust gas channel 42 is at a point where the hydrogen partial pressure is the lowest in the fuel gas supply channel. By keeping the hydrogen partial pressure HP at this point equal to or higher than the lower limit value, it is possible to suppress deterioration of the fuel cell stack 2.

A second requirement is that the pressure of the fuel gas supply system 3 does not exceed a hydrogen system control upper limit pressure. Therefore, the state quantity which is the inlet pressure IP of the fuel gas of the second fuel supply channel 22 is needed to be controlled so as not to exceed an upper limit value. Then, the open or closed state of the exhaust drainage valve 58 is set as the operation amount for controlling the inlet pressure IP.

A third requirement is that hydrogen is supplied up to the back side of the stack by making the variation in hydrogen distribution in a stack stacking direction uniform. To this end, the state quantity which is a current flow rate value CF of hydrogen is needed to be controlled to a target flow rate value TF. Then, a rotation speed RT of the pump 54 is set as the operation amount for controlling the current flow rate value CF of hydrogen.

Operation Example of Fuel Gas Supply System 3

An operation example of the fuel gas supply system 3 controlled by the ECU 100 will be described with reference to a time chart of FIG. 2. In FIG. 2, in a first period P1 up to time t1, a load state is normal. In a second period P2 from time t1 to time t2, for example, by increasing an accelerator operation amount operated by the user, the load is high. In a third period P3 after time t2, the load state is restored to the normal load state.

First, the control of the hydrogen partial pressure HP by the injector 20 will be described. The ECU 100 specifies the current demand load for the fuel cell stack 2 and specifies the target hydrogen partial pressure corresponding to the current demand load as a demand hydrogen partial pressure. The demand hydrogen partial pressure is a demanded value for the hydrogen partial pressure in the exhaust gas channel 42. Next, the ECU 100 calculates a first lower limit value LL1 and a first upper limit value UL1 of the hydrogen partial pressure based on the demand hydrogen partial pressure. Since the fuel cell stack 2 deteriorates when the hydrogen partial pressure HP is lower than the first lower limit value LL1, the first lower limit value LL1 is a significant requirement. The first upper limit value UL1 is a value obtained by adding a predetermined margin amount to the first lower limit value LL1.

Then, the ECU 100 estimates the hydrogen partial pressure HP by functioning as the hydrogen partial pressure acquisition unit. Then, feedback control is executed such that the estimated hydrogen partial pressure HP falls within the range from the first upper limit value UL1 to the first lower limit value LL1. This will be described in detail. In the first period P1, the ECU 100 stops driving the injector 20 (that is, brings it to a closed state) when the hydrogen partial pressure HP reaches or exceeds the first upper limit value UL1 in the state where the injector 20 is driven (that is, the open state) (see arrow A1). In this way, the amount of hydrogen supplied to the fuel cell stack 2 decreases, and the hydrogen partial pressure HP goes down. Further, the ECU 100 start driving the injector 20 (that is, brings it to an open state) when the hydrogen partial pressure HP falls to or below the first lower limit value LL1 in a state where the injector 20 is stopped (that is, the closed state) (see arrow A2). In this way, the amount of hydrogen supplied to the fuel cell stack 2 increases, and the hydrogen partial pressure HP rises.

When the load state shifts to the high load state at time t1, the first lower limit value LL1 and the first upper limit value UL1 increase. Therefore, the ECU 100 keeps the injector 20 in the open state until the hydrogen partial pressure HP rises and reaches the first upper limit value UL1 (see region R1). When the load state shifts to the normal load state at time t2, the first lower limit value LL1 and the first upper limit value UL1 decrease. Therefore, the ECU 100 keeps the injector 20 in the closed state until the hydrogen partial pressure HP drops and reaches the first lower limit value LL1 (see region R2).

Second, the control of the inlet pressure IP by the exhaust drainage valve 58 will be described. The ECU 100 calculates a second lower limit value LL2 and second upper limit value UL2 of the inlet pressure IP based on the demand load on the fuel cell stack 2. When the inlet pressure IP exceeds the second upper limit value UL2, there is a possibility of failure, and thus the second upper limit value UL2 is a requirement. The second lower limit value LL2 is a value obtained by subtracting a predetermined margin amount from the second upper limit value UL2. When the margin amount is large, the deviation from the target value becomes large, and when the margin amount is small, the frequency of opening and closing the exhaust drainage valve 58 increases and the part durability deteriorates. Therefore, the margin amount may be appropriately set to balance the deviation amount from the target value and the opening and closing frequency.

Then, the ECU 100 executes feedback control such that the inlet pressure IP falls within the range from the second upper limit value UL2 to the second lower limit value LL2. This will be described in detail. In the first period P1, the ECU 100 opens the exhaust drainage valve 58 when the inlet pressure IP reaches or exceeds the second upper limit value UL2 in a state where the exhaust drainage valve 58 is closed (see arrow A3). In this way, the inlet pressure IP goes down. Further, the ECU 100 closes the exhaust drainage valve 58 when the inlet pressure IP falls to or below the second lower limit value LL2 in a state where the exhaust drainage valve 58 is open (see arrow A4). In this way, the inlet pressure IP rises.

When the load state shifts to the high load state at time t1, the second lower limit value LL2 and the second upper limit value UL2 increase. Therefore, the ECU 100 keeps the exhaust drainage valve 58 in the closed state until the inlet pressure IP rises and reaches the second upper limit value UL2 (see region R3). When the load state shifts to the normal load state at time t2, the second lower limit value LL2 and the second upper limit value UL2 decrease. Therefore, the ECU 100 keeps the exhaust drainage valve 58 in the open state until the inlet pressure IP drops and reaches the second lower limit value LL2 (see region R4).

The opening of the exhaust drainage valve 58 is not limited to the case where the inlet pressure IP reaches or exceeds the second upper limit value UL2. For example, the ECU 100 may control the exhaust drainage valve 58 to be opened to discharge the liquid water to the outside when the amount of the liquid water stored in the gas-liquid separator 50 reaches a predetermined amount.

Third, control of a current flow rate value CF of hydrogen by the pump 54 will be described. The ECU 100 calculates a target flow rate value TF of hydrogen discharged from the pump 54 based on the demand load on the fuel cell stack 2. For example, the ECU 100 may calculate the target flow rate value TF based on the current value generated by the fuel cell stack 2 or the temperature of the fuel cell stack 2.

The ECU 100 estimates the inlet hydrogen concentration HC by functioning as the inlet hydrogen concentration acquisition unit. Further, the ECU 100 acquires a measured value of the discharge flow rate DR of the pump 54 from the flow meter 55. Then, the ECU 100 calculates the current flow rate value CF of the hydrogen discharged from the pump 54 based on the inlet hydrogen concentration HC and the discharge flow rate DR. The current flow rate value CF of hydrogen is a value representing the amount of hydrogen supplied per unit time.

Then, the ECU 100 controls the pump 54 such that the current flow rate value CF of hydrogen approaches the target flow rate value TF. In this way, as shown in FIG. 2, the current flow rate value CF shown by a solid line can be made to follow the target flow rate value TF shown by a dotted line. The control method may be various. For example, feedback control may be executed with the deviation between the target flow rate value TF and the current flow rate value CF as the target variable and with the rotation speed RT of the pump 54 as the operation variable. For the feedback control, various control methods such as PI control, PID control, P control, and I control can be used.

Effects

In the fuel gas supply system in the related art, a "multi-input-multi-output structure" has been used in which control of a plurality of state quantities is implemented by the operation amount of a plurality of system parts. In this case, when some characteristics of the fuel gas supply system are changed (e.g., changes in drive parts such as valves and pumps, changes in piping shape, or the like), models of the entire fuel gas supply system need to be reviewed. Therefore, for example, when a fuel gas supply system for passenger cars is applied to others (e.g., buses, trucks, trains, ships, or stationary generators), it is needed to build a prototype fuel gas supply system and evaluate the conformity of the entire system. It is likely to increase the development man-hours and development period increased, and to increase the development cost.

Therefore, in the fuel gas supply system 3 of the present specification, three single input-single output structures of (1) controlling the hydrogen partial pressure HP by the open or closed state of the injector 20, (2) controlling the inlet pressure IP by the open or closed state of the exhaust drainage valve 58, and (3) controlling the current flow rate value CF of hydrogen by the rotation speed RT of the pump 54 are provide independently of each other. In this way, even when some characteristics of the fuel gas supply system is changed, it is sufficient that operation adaptation is performed just for one state quantity related to the changed characteristic. For example, when the injector 20 is changed, it is sufficient that just the operation adaptation for the injector 20 is performed such that the hydrogen partial pressure HP falls within the range from the first upper limit value UL1 to the first lower limit value LL1. In this case, the operation adaptation is not needed for the exhaust drainage valve 58 used for controlling the inlet pressure IP. In this way, when the fuel gas supply system 3 is expanded to other applications, it is possible to significantly reduce the development man-hours.

Embodiment 2

In Embodiment 2, an aspect in which the fuel gas supply system 3 of Embodiment 1 is further provided with the first and second machine learning units will be described. The same parts as those of the fuel gas supply system 3 of Embodiment 1 are designated by the same reference numerals, and the description thereof will be omitted.

The memory 102 stores first and second programs, and first and second learning models. The first and second programs are executed by the CPU 101 to cause the CPU 101 to function as the first and second machine learning units.

The first learning model is a model for calculating a first feedback gain of control of the injector 20 in response to the hydrogen partial pressure HP. The first machine learning unit updates the first learning model by using a correlation between the operation amount of the injector 20 and the fluctuation amount of the hydrogen partial pressure HP as training data. The ECU 100 controls the injector 20 based on the first feedback gain determined by the first learning model. For example, the opening degree of the injector 20 may be increased as the first feedback gain becomes larger. In this way, it is possible to appropriately adjust the first feedback gain without having to do anything complicated work. In controlling the hydrogen partial pressure HP by the injector 20, it is possible to suppress overshoot and improve the response speed.

The second learning model is a model for calculating a second feedback gain of control of the exhaust drainage valve 58 in response to the inlet pressure IP. The second machine learning unit updates the second learning model by using a correlation between the operation amount of the exhaust drainage valve 58 and the fluctuation amount of the inlet pressure IP as training data. The ECU 100 controls the exhaust drainage valve 58 based on the second feedback gain determined by the second learning model. For example, the opening degree of the exhaust drainage valve 58 may be increased as the second feedback gain becomes larger. In this way, it is possible to appropriately adjust the second feedback gain without having to do anything complicated work. In controlling the inlet pressure IP by the exhaust drainage valve 58, it is possible to suppress overshoot and improve the response speed.

Although specific examples of the present disclosure have been described in detail above, these are merely examples and do not limit the scope of claims. The techniques described in the claims include various modifications and changes of the specific examples illustrated above.

The technical elements described herein or in the drawings exhibit their technical usefulness alone or in various combinations, and are not limited to the combinations described in the claims at the time of filing. In addition, the techniques exemplified in the present specification or the drawings can achieve a plurality of purposes at the same time, and achieving one of the purposes itself has technical usefulness.

Modification Example

The control of the injector 20, the exhaust drainage valve 58, and the pump 54 is not limited to the feedback control, and various control methods can be used. For example, various control methods such as feedforward control and model predictive control (MPC) may be used, or a plurality of control methods may be combined.

The hydrogen partial pressure HP and the inlet hydrogen concentration HC are not limited to the estimated values, but may be measured values acquired by the sensor. Further, the inlet hydrogen concentration HC may be a value calculated from the hydrogen partial pressure HP. Further, the discharge flow rate DR is not limited to the measured value by the flow meter 55. For example, the discharge flow rate DR may be a value estimated from the volume and the rotation speed of the pump 54.

The pressure sensor 24 is an example of the inlet pressure acquisition unit. The exhaust gas channel 42 and the exhaust drainage channel 56 are an example of the discharge channel. The exhaust drainage valve 58 is an example of the discharge valve. The flow meter 55 is an example of the flow rate acquisition unit.

What is claimed is:

1. A fuel gas supply system for a fuel cell, the fuel gas supply system comprising:
    an injector connected to a fuel gas inlet of a fuel cell stack through a supply channel and configured to supply a fuel gas;
    an inlet pressure acquisition unit configured to acquire an inlet pressure that is a pressure of the supply channel;
    a discharge valve connected to a fuel gas outlet of the fuel cell stack through a discharge channel;
    a hydrogen partial pressure acquisition unit configured to acquire a hydrogen partial pressure of a fuel off gas in the discharge channel; and
    a controller, wherein:
    the controller is configured to
        specify a first upper limit value and a first lower limit value corresponding to the hydrogen partial pressure based on a demand load on the fuel cell stack, stop driving the injector when the hydrogen partial pressure reaches or exceeds the first upper limit value in a state where the injector is being driven, and start driving the injector when the hydrogen partial pressure falls to or below the first lower limit value in a state where the injector is stopped, and the controller is configured to specify a second upper limit value and a second lower limit value corresponding to the inlet pressure based on the demand load on the fuel cell stack, open the discharge valve when the inlet pressure reaches or exceeds the second upper limit value in a state where the discharge valve is closed, and close the discharge valve when the inlet pressure falls to or below the second lower limit value in a state where the discharge valve is open.

2. The fuel gas supply system according to claim 1, further comprising:

a circulation channel configured to connect the discharge channel and the supply channel;

a pump disposed on the circulation channel and configured to deliver the fuel off gas to the supply channel;

an inlet hydrogen concentration acquisition unit configured to acquire an inlet hydrogen concentration at an inlet of the pump; and a flow rate acquisition unit configured to acquire a discharge flow rate of the pump, wherein the controller is configured to specify a target flow rate value of hydrogen discharged from the pump based on the demand load on the fuel cell stack, calculate a current flow rate value of hydrogen discharged from the pump based on the inlet hydrogen concentration and the discharge flow rate, and control the pump such that the current flow rate value approaches the target flow rate value.

3. The fuel gas supply system according to claim 2, wherein the controller is configured to execute feedback control of a rotation speed of the pump to reduce a deviation between the target flow rate value and the current flow rate value.

4. The fuel gas supply system according to claim 1, further comprising a gas-liquid separator provided in the discharge channel and configured to separate and store liquid water contained in the fuel off gas, wherein the controller is configured to open the discharge valve and discharge the liquid water stored in the gas-liquid separator to an outside in response to the liquid water reaching a predetermined amount.

5. The fuel gas supply system according to claim 1, further comprising a first machine learning unit that includes a first learning model configured to calculate a first feedback gain of control of the injector in response to the hydrogen partial pressure, wherein:

the first machine learning unit is configured to update the first learning model by using a correlation between an operation amount of the injector and a fluctuation amount of the hydrogen partial pressure as training data; and the controller is configured to control the injector based on the first feedback gain determined by the first learning model.

6. The fuel gas supply system according to claim 1, further comprising a second machine learning unit that includes a second learning model configured to calculate a second feedback gain of control of the discharge valve in response to the inlet pressure, wherein:

the second machine learning unit is configured to update the second learning model by using a correlation between an operation amount of the discharge valve and a fluctuation amount of the inlet pressure as training data; and the controller is configured to control the discharge valve based on the second feedback gain determined by the second learning model.

7. A method of controlling a fuel gas supply system including an injector connected to a fuel gas inlet of a fuel cell stack through a supply channel and configured to supply a fuel gas, an inlet pressure acquisition unit configured to acquire an inlet pressure that is a pressure of the supply channel, a discharge valve connected to a fuel gas outlet of the fuel cell stack through a discharge channel, and a hydrogen partial pressure acquisition unit configured to acquire a hydrogen partial pressure of a fuel off gas in the discharge channel, the method comprising:

specifying a first upper limit value and a first lower limit value corresponding to the hydrogen partial pressure based on a demand load on the fuel cell stack;

stopping driving the injector when the hydrogen partial pressure reaches or exceeds the first upper limit value in a state where the injector is being driven;

starting driving the injector when the hydrogen partial pressure falls to or below the first lower limit value in a state where the injector is stopped;

specifying a second upper limit value and a second lower limit value corresponding to the inlet pressure based on the demand load on the fuel cell stack;

opening the discharge valve when the inlet pressure reaches or exceeds the second upper limit value in a state where the discharge valve is closed; and closing the discharge valve when the inlet pressure falls to or below the second lower limit value in a state where the discharge valve is open.

* * * * *